United States Patent Office 3,654,233
Patented Apr. 4, 1972

3,654,233
PROCESS FOR THE MANUFACTURE OF LINEAR POLYESTERS USING METAL GERMANATES AND METAL GLYCOL GERMANATES AS THE CATALYST
Christian Kosel, Bobingen, and Adolf Hartmann, Gesserts-hausen, Germany, assignors to Farbwerke Hoechst Aktiengesellschaft vormals Meister Lucius & Bruning, Frankfurt am Main, Germany
No Drawing. Filed Apr. 29, 1968, Ser. No. 725,153
Claims priority, application Germany, May 5, 1967, F 52,329
Int. Cl. C08g 17/13
U.S. Cl. 260—75 R
4 Claims

ABSTRACT OF THE DISCLOSURE

Manufacturer of linear polyesters by an ester-interchange between dicarboxylic acid esters of low molecular weight aliphatic alcohols and diols and subsequent polycondensation of the bis-diol esters in the presence of metal germanates and metal glycol germanates as compounds catalyzing both the ester-interchange and the polycondensation.

---

The present invention relates to a process for the manufacture of linear polyesters.

Linear polyesters which can be used for making filaments, fibers and films, and plastics materials in general, are usually obtained by an ester-interchange between dicarboxylic acid esters and diols and subsequent polycondensation of the resulting bis-diol esters. As starting materials, terephthalic acid dimethyl ester and ethylene glycol or 1,4-dimethylolcyclohexane are preferably used.

Certain catalysts must be added to achieve that the ester-interchange as well as the polycondensation proceed sufficiently completely and with a speed which renders the process suitable for use in industry. In general, a combination of two or more catalysts is used because some catalysts accelerate chiefly the ester-interchange and others the polycondensation. A large number of such catalysts have been known. As ester-interchange catalysts there may be used, for example, the oxides, salts or organic compounds of the metals calcium, magnesium, zinc, cadmium, manganese and cobalt. It is also possible to use the metals as such. The polycondensation is chiefly catalyzed by compounds of lead, titanium and preferably antimony. Two additions of catalyst are therefore usually made to the reaction mixture, generally one before and one after the ester-interchange.

The quality of the products obtained depends largely on the nature of the catalysts used. The obtained products are in many cases grey or have a more or less yellow discoloration. It has already been proposed to make substantially colorless polyesters of a high degree of whiteness which are of great technical interest by using elementary germanium or germanium compounds, for example, germanium oxides or alkoxides or germanium tetrachloride, as polycondensation catalysts. It has also been proposed to use germanium (II) phosphite as polycondensation catalyst. All these germanium compounds must be used, however, in combination with usual ester-interchange catalysts, for example, calcium acetate, zinc acetate or manganous acetate.

One has therefore been interested in industry to use catalysts which catalyze both the ester-interchange and the polycondensation. All attempts to this effect have been little successful so far since either polyesters of only unsatisfactory quality were obtained or the activity of the catalysts was too small. When, for example, lead oxide or tetrabutyl titanate are used as ester-interchange and polycondensation catalysts, yellowish condensates are obtained. Catalysts pronouncedly catalyzing the polycondensation, for example, antimony trioxide, germanium dioxide or germanium alkoxides, have only a poor catalyzing action on the ester-interchange in the usual temperature range of from 150 to 220° C. Only at temperatures between 230 and 280° C. does the ester-interchange with, for example, germanium tetraethoxide proceed faster. To reach such high temperatures in the ester-interchange, pressure vessels must be used or the diol must be introduced gradually in a complicated and time-consuming manner.

Now we have found that linear polyesters can be obtained by an ester-interchange between dicarboxylic acid esters of low aliphatic alcohols and diols and subsequent polycondensation of the resulting bis-diol esters in the presence of germanium compounds while avoiding the above disadvantages, by using metal germanates and metal glycol germanates as compounds catalyzing both the ester-interchange and the polycondensation. As metal germanates, there are advantageously used the germanates of alkali metals, alkaline earth metals, zinc, cadmium, indium, lanthanum, tin, lead, manganese and cobalt. Of the alkali metal- and alkaline earth metal germanates it is advantageous to use the lithium, sodium, potassium, magnesium, calcium, strontium and barium compounds.

By the term "metal glycol germanates" is meant herein to mean also compounds which contain, in addition to germanium and the above metals, also organic hydroxyl compounds, advantageously ethylene glycol, bound in the form of a complex. These compounds, at least if they contain ethylene glycol bound in the form of a complex, are new and are derived in that case from alkoxoacid $$H_2[Ge(OCH_2CH_2O)_3]$$

they correspond, for example, to the following formulae $$Me^I_2[Ge(OCH_2CH_2O)_3], [Me^{II}(HOCH_2CH_2OH)_3]$$
$$[Ge(OCH_2CH_2O)_3] \text{ and } [Me^{III}(HOCH_2CH_2OH)_x]_2$$
$$[Ge(OCH_2CH_2O)_3]_3$$

in which $Me^I$, $Me^{II}$ and $Me^{III}$ represent the ions of the above metals and $x$ is zero or a low integer. The metal glycol germanates are particularly well suitable for use as ester-interchange and polycondensation catalysts because of their excellent solubility in the ester-interchange mixture and their high activity.

The metal germanates can be obtained according to known methods, for example, by fusing the metal oxides or metal carbonates with germanium dioxide or by precipitating the germanates, which are generally difficulty soluble, in an aqueous medium.

Metal glycol germanates of the above compositions have not been known so far. Their synthesis starts from germanium glycolate and the acetate of the metal to be used as the cation, for example manganous acetate. The reaction is carried out in ethylene glycol and yields the well crystallizable complex compounds in an almost quantitative yield. The said complex compounds have good storage properties and are insensitive to moisture and air.

As starting materials for the manufacture of linear polyesters according to the invention there may be used the esters of numerous dicarboxylic acids with low molecular weight aliphatic alcohols containing advantageously 1 to 4 carbon atoms. Generally, the methyl esters are used.

As dicarboxylic acid components of these esters it is particularly advantageous to use adipic acid, sebacic acid, terephthalic acid, isophthalic acid, 4,4'-diphenyldicarboxylic acid, sulfonyl-4,4'-dibenzoic acid, 2,6-naphthalenedicarboxylic acid, 1,2-cyclobutanedicarboxylic acid and 2,5-thiophenedicarboxylic acid.

As diols for the ester-interchange with the dicarboxylic acid esters of low alcohols there are advantageously used diols with 2 to 8 carbon atoms, for example, ethylene glycol, 1,4-butylene glycol, 2,2-dimethylpropanediol-1,3, diethylene glycol, 1,2- and 1,3-cyclobutanediol, 1,4-dimethylol-cyclohexane, m- and p-xylylene glycol. Instead of one dicarboxylic acid ester and one diol, it is also possible to use several dicarboxylic acid esters and/or diols as starting substances in each case. Hydroxycarboxylic acids or hydroxycarboxylic acid esters, for example p-hydroxybenzoic acid methyl ester, may also be added to the starting reaction mixture. In this manner, a plurality of copolyesters with specific properties can be obtained.

The ester-interchange and the polycondensation are carried out in known manner. A mixture of corresponding dicarboxylic acid esters of one or more low molecular weight aliphatic alcohols and one or more diols with advantageously 2 to 8 carbon atoms is heated at the boil under atmospheric pressure with the exclusion from air in the presence of the germanate catalyst until such an amount of low aliphatic alcohol as corresponds to the ester-interchange has been distilled off. The diols are advantageously used in about one and a half the theoretically required amount. The complete ester-interchange takes 2 to 4 hours depending on the amount and type of the germanate catalyst. The amount of germanate catalyst should be within the range of from 0.005 to 0.5% by weight, advantageously 0.01 to 0.05% by weight, calculated on the starting dicarboxylic acid ester or esters. The catalyst may consist of a simple germanate or of a mixture of different metal germanates. It is also possible to use germanates which contain different metal cations, for example Ca- and Mn-ions, at the same time. The metal germanate catalysts generally spread of themselves uniformly, in the reacton mixture already during the ester-interchange so that the subsequent polycondensation starts particularly rapidly.

At the end of the ester-interchange the temperature should be about 220° C. There are then added in known manner a stabilizer, for example, phosphorous acid or triphenyl phosphite, in an amount advantageously within the range of from 0.005 to 0.1% by weight calculated on the total reaction mixture to increase the thermal stability of the reaction melt, and if desired, a delustrant, for example TiO$_2$, a pigment, an optical brightener or a similar additive and the temperature is gradually raised to 280° C. while stirring. The pressure is simultaneously gradually raduced to about 0.3 mm. of mercury and the diol in excess is removed at a descending cooler. Depending on the apparatus and the amount of catalyst used, the reaction mass is kept for 1 to 5 hours under the indicated conditions and then discharged into cold water. The relative viscosity of the resulting polyester is within the range of from 1.5 to 2.1 determined on a 1% by weight solution in phenol/tetrachlorethane (ratio by volume 60 to 40) at 25° C. The products are colorless if no pigment has been added, and crystal clear if they contain no delustrant. Lightness and whiteness are very high and excel those of polyesters obtained with the help of other catalysts, for example, titanium tetrabutylate or manganous acetate-antimony trioxide.

The crude materials obtained by the process of the invention can therefore advantageously be used for making plastics materials, and are particularly suited for fibers, filaments and films of which clarity and a high degree of whiteness are demanded.

The metal germanates to be used as catalysts in the process of the invention cannot only be used for the above described discontinuous mode of carrying out the ester-interchange and the polycondensation, but may also be used with advantage for the continuous manufacture of polyesters because they can be introduced into the reaction mixture in a particularly simple manner.

The high molecular weight products obtained by the process in accordance with the invention can be processed in known manner without difficulty. Polyethylene terephthalate can be spun, for example, on extruders in an irreproachable manner. The filaments obtained can easily be drawn by a multiple of their original length and then possess the good textile properties known in polyester fibers; their whiteness, however, is generally superior to that of the known polyesters.

Besides yielding products of improved whiteness, the process in accordance with the invention has the important advantage of requiring only a single addition of catalyst, either before or at the beginning of the ester-interchange.

The following examples serve to illustrate the invention, but are not intended to limit it.

EXAMPLE 1

A mixture of 1200 grams dimethyl terephthalate, 880 grams ethylene glycol and 0.36 gram manganous germanate was heated at the boil with the exclusion of air until the amount of methanol corresponding to the ester-interchange had been distilled off, which took about 4 hours. The final temperature was about 220° C. After the addition of 0.18 gram phosphorous acid the temperature was gradually increased to 280° C. while stirring. Simultaneously, the pressure was gradually reduced to about 0.3 mm. of mercury and the ethylene glycol in excess was distilled off. The reaction mass was kept for about 2 hours under the indicated conditions and then discharged into cold water.

The colorless, crystal clear polyethylene terephthalate so obtained had a relative viscosity of 1.847 determined at 25° C. in a 1% by weight solution in phenol/tetrachlorethane (60:40), and a melting point of 258° C. The product could be spun in known manner into filaments which had a high strength after having been drawn to 4.5 times their original length. The whiteness and lightness of the filaments were excellent. The polyester could also be used with particular advantage for making transparent sheets.

EXAMPLE 2

A mixture of 2200 grams dimethyl terephthalate, 1615 grams ethylene glycol and 0.66 gram manganous germanate was subjected to an ester-interchange as described in Example 1. Then 0.22 gram phosphorous acid and 8.8 grams titanium dioxide suspended in 40 grams ethylene glycol were added. The polycondensation took the same course as in Example 1. The condensate so obtained, having a melting point of 257° C. and a relative viscosity of 1.840 determined as described in Example 1, and the filaments made therefrom had a very high degree of whiteness.

EXAMPLE 3

In the manner described in Example 1, 500 grams dimethyl terephthalate were subjected for 2.5 hours to an ester-interchange with 367 grams ethylene glycol in the presence of 0.12 gram zinc germanate. After the addition of 0.05 gram phosphorous acid the polycondensation was carried out as described in Example 1. The product so obtained had a melting point of 259° C. and a relative viscosity of 1.855 determined as described in Example 1. The product was transparent, had a very high degree of lightness and could be made into filaments, sheets and films in an irreproachable manner.

EXAMPLE 4

The process was carried out in a manner analogous to Example 3 but while using 0.2 gram cadmium germanate instead of zinc germanate. The polycondensation product obtained had a relative viscosity of 1.800 determined as described in Example 1 and a melting point of 257° C. Whiteness and spinnability were very good.

EXAMPLE 5

A mixture of 500 grams dimethyl terephthalate, 75 grams dimethyl isophthalate, 420 grams ethylene glycol and 0.2 gram cadmium germanate was subjected to ester-interchange and polycondensation as described in Example 1. Before the condensation 0.05 gram phosphorous acid was added. The copolyester so obtained had a relative viscosity of 1.844 determined as described in Example 1 and a melting point of 234° C. It was well spinnable.

EXAMPLE 6

In the manner described in Example 1, 350 grams dimethyl terephthalate, 150 grams 2,6-naphthalenedicarboxylic acid dimethyl ester, 367 grams ethylene glycol and 0.15 gram lead germanate were subjected to an ester-interchange and then polycondensed. After the ester-interchange 0.15 gram triphenyl phosphite was added, whereupon a turbidity appeared which dissolved completely in the course of the polycondensation. The product so obtained had a relative viscosity of 1.787 determined as described in Example 1 and a melting point of 188 to 191° C. The product was suited for injection molded articles.

EXAMPLE 7

A mixture of 400 grams dimethyl terephthalate, 100 grams sebacic acid dimethyl ester, 367 grams ethylene glycol and 0.15 gram manganous germanate was subjected to an ester-interchange as described in Example 1, 0.06 gram phosphorous acid was added and the whole was polycondensed. The copolyester so obtained had a relative viscosity of 2.010 determined as described in Example 1 and a melting point of 205° C.

EXAMPLE 8

In the manner described in Example 1, 500 grams dimethyl terephthalate, 367 grams ethylene glycol, 80 grams dibutylene glycol and 0.125 gram zinc germanate were subjected to an ester-interchange and then polycondensed. Before the polycondensation 0.05 gram phosphorous acid was added. The copolyester so obtained had a melting point of 241° C. and a relative viscosity of 1.748 determined as described in Example 1.

EXAMPLE 9

In the manner described in Example 1, a mixture of 500 grams dimethyl terephthalate, 367 grams ethylene glycol, 50 grams 1,4-dimethylolcyclohexane and 0.15 gram manganous germanate was subjected to an ester-interchange, 0.06 gram phosphorous acid was added and the whole was polycondensed. The copolyester so obtained had a relative viscosity of 1.800 determined as described in Example 1 and a melting point of 237° C.

EXAMPLE 10

450 grams dimethyl terephthalate, 50 grams 1,2-cyclobutanedicarboxylic acid dimethyl ester and 367 grams ethylene glycol were subjected to an ester-interchange with the addition of 0.075 gram manganous germanate and 0.075 gram zinc germanate, 0.05 gram phosphorous acid was added and the whole was polycondensed as described in Example 1. The copolyester so obtained had a melting point of 233° C. and a relative viscosity of 1.933 determined as described in Example 1.

EXAMPLE 11

A mixture of 500 grams dimethyl terephthalate, 367 grams ethylene glycol and 0.5 gram lithium germanate was subjected to an ester-interchange as described in Example 1, 0.3 gram phosphorous acid was added and the whole was polycondensed. The polyester so obtained had a relative viscosity of 1.872 determined as described in Example 1 and a melting point of 257° C.

EXAMPLE 12

In the manner described in Example 1, 500 grams dimethyl terephthalate, 367 grams ethylene glycol and 45 grams 2,2-dimethylpropanediol-1,3 were subjected to an ester-interchange in the presence of 0.4 gram calcium germanate, 0.2 gram phosphorous acid was added and the whole was polycondensed. The copolyester so obtained had a melting point of 221° C. and a relative viscosity of 1.825 determined as described in Example 1.

EXAMPLE 13

(a) Preparation of catalyst 100 grams amorphous germanium dioxide were dissolved under nitrogen in 2 liters of boiling ethylene glycol. The solution was cooled to 60° C. and then combined with the exclusion of air with a solution of 246 grams manganous acetate tetrahydrate in 1.8 liters ethylene glycol free from oxygen which had been prepared at room temperature. After a short time, a colorless to light pink manganous glycol germanate crystallized out. To complete the separation the suspension was cooled to about 5° C. The product which was insensitive to air was suction filtered, washed with acetone until free from glycol and dried at 110° C. under 12 mm. of mercury. There were obtained 463 grams manganous glycol germanate, which corresponded to 98% of the theoretical, calculated on germanium dioxide. The melting point was 174° C.

The manganous glycol germanate had the following composition:

Calculated for $C_{12}H_{30}GeMnO_{12}$ (percent): C, 29.18; H, 6.12, Ge, 14.70; Mn, 11.12. Found (percent): C, 29.30; H, 6.25; Ge, 14.44; Mn, 11.46.

(b) Ester-interchange and polycondensation 500 grams dimethyl terephthalate were subjected to an ester-interchange with 400 grams ethylene glycol in the presence of 0.325 gram manganous glycol germanate as described in Example 1, and polycondensed after the addition of 0.055 gram phosphorous acid. The product so obtained had a melting point of 258° C. and a relative viscosity of 1.858 determined as described in Example 1. The product was colorless and transparent. Filaments made therefrom had a particularly high degree of whiteness.

EXAMPLE 14

The process for the synthesis of manganous glycol germanate described in Example 13 was applied in analogous manner to the preparation of zinc glycol germanate. As starting materials 5 grams germanium dioxide dissolved in 100 ml. ethylene glycol and 10.5 grams zinc acetate dihydrate dissolved in 80 ml. ethylene glycol were used. A colorless crystalline zinc glycol germanate melting at 193° C. was obtained in a yield of 23.1 grams, which corresponded to 96% of the theoretical, calculated on germanium dioxide.

Composition.—Calculated for $C_{12}H_{30}GeO_{12}Zn$ (percent): C, 28.58; H, 6.00; Ge, 14.39; Zn, 12.96. Found (percent): C, 28.30; H, 6.06; Ge, 14.95; Zn, 12.68.

The zinc glycol germanate was used as catalyst as described in Example 13. Instead of manganous glycol germanate, the same amount of zinc glycol germanate was used. The polyester so obtained had a melting point of 257° C. and a relative viscosity of 1.789 determined as described in Example 1. Whiteness and spinnability were excellent.

What is claimed is:

1. In the process for the manufacture of linear fiber and film forming polyesters by an ester-interchange between a dicarboxylic acid ester of a low molecular weight aliphatic alcohol and a diol, and subsequent polycondensation of the bis-diol ester so produced in the presence of germanium compounds as a catalyst, the improvement which comprises conducting the ester-interchange and the polycondensation in the presence of from 0.005 to 0.5% by weight based on the amount of dicarboxylic acid ester of a catalyst comprising at least one compound selected from the group consisting of a metal germanate where the metal is an alkali metal, a metal germanate wherein the metal is an alkaline earth metal, zinc germanate, cadmium germanate, indium germanate, lanthanum germanate, tin germanate, lead germanate, manganous germanate, cobalt germanate, a metal glycol germanate wherein the metal is an alkali metal, a metal glycol germanate wherein the metal is an alkaline earth metal, zinc glycol germanate, cadmium glycol germanate, indium glycol germanate, lanthanum glycol germanate, tin glycol germanate, lead glycol germanate, manganous glycol germanate and cobalt glycol germanate.

2. The process according to claim 1 wherein the catalyst comprises at least one compound selected from the group consisting of a metal germanate wherein the metal is an alkali metal, a metal germanate wherein the metal is an alkaline earth metal, zinc germanate, cadmium germanate, indium germanate, lanthanum germanate, tin germanate, lead germanate, manganous germanate and cobalt germanate.

3. The process according to claim 1 wherein the catalyst comprises at least one compound selected from the group consisting of a metal glycol germanate wherein the metal is an alkali metal, a metal glycol germanate wherein the metal is an alkaline earth metal, zinc glycol germanate, cadmium glycol germanate, indium glycol germanate, lanthanum glycol germanate, tin glycol germanate, lead glycol germanate, manganous glycol germanate and cobalt glycol germanate.

4. The process according to claim 1 wherein the catalyst comprises at least one compound selected from the group consisting of zinc germanate, cadmium germanate, lanthanum germanate, lead germanate, manganous germanate, cobalt germanate, lithium germanate, sodium germanate, magnesium germanate, calcium germanate, strontium germanate, barium germanate, metal glycol germanates of the formula $Me_2[Ge(OCH_2CH_2O)_3]$ wherein Me stands for lithium, sodium and potassium, metal glycol germanates of the formula $[Me(HOCH_2CH_2OH)_3]$, $[Ge(OCH_2CH_2O)_3]$ wherein Me stands for zinc, cadmium, lead, manganese, cobalt, magnesium, calcium, strontium and barium, and metal glycol germanates of the formula $[Me(HOCH_2CH_2OH)_x]_2[Ge(OCH_2CH_2O)_3]_3$ wherein Me stands for lanthanum, and cobalt and $x$ stands for zero or a low integer.

References Cited

UNITED STATES PATENTS 3,346,541  10/1967  Davies et al. _____ 260—75

OTHER REFERENCES

Pascal Nouveau Traité de Chimie Minêrale Tome VIII, Germanium, Etain, Plomb, Troisième Fascicule, published 1963. Masson et Cie, Paris, France, pp. 118–120, 126–128, 130, 132, 134 and 135.

MELVIN GOLDSTEIN, Primary Examiner

U.S. Cl. X.R.

260—47 C, 475 P